United States Patent [19]
Yoldas

[11] 3,944,658
[45] Mar. 16, 1976

[54] TRANSPARENT ACTIVATED NONPARTICULATE ALUMINA AND METHOD OF PREPARING SAME

[75] Inventor: Bulent E. Yoldas, Toledo, Ohio

[73] Assignee: Owens-Illinois, Inc., Toledo, Ohio

[22] Filed: Sept. 13, 1973

[21] Appl. No.: 396,754

Related U.S. Application Data

[60] Division of Ser. No. 281,434, Aug. 17, 1972, abandoned, which is a continuation-in-part of Ser. No. 234,303, March 13, 1972, abandoned.

[52] U.S. Cl. ............... 423/626; 423/625; 423/630; 252/463; 252/317
[51] Int. Cl.² ............... C01F 7/02; B01J 23/08
[58] Field of Search .............. 423/625, 626, 630; 252/317, 463

[56] References Cited
UNITED STATES PATENTS

| | | | |
|---|---|---|---|
| 2,915,475 | 12/1959 | Bogosh | 423/625 X |
| 3,108,888 | 10/1963 | Bogosh | 423/625 X |
| 3,264,063 | 8/1966 | Carter | 423/630 |
| 3,357,791 | 12/1967 | Napier | 423/630 |
| 3,647,374 | 3/1972 | Nomura et al. | 423/630 |

FOREIGN PATENTS OR APPLICATIONS

| | | | |
|---|---|---|---|
| 160,696 | 9/1952 | Australia | 423/630 |

*Primary Examiner*—Herbert T. Carter
*Attorney, Agent, or Firm*—Robert F. Rywalski; Edward J. Holler

[57] ABSTRACT

A transparent, activated, nonparticulate alumina with a total porosity of about 63% which consists of a unique pore morphology and size distribution and is thermally stable up to about 1,200°C. at which temperature it can be nondestructively converted to alpha alumina is disclosed as well as a method of preparing said alumina by hydrolyzing aluminum alkoxides to form a particular sol which is essentially clear to the naked eye and the gel of which retains its integrity during drying and pyrolysis. The alumina thus produced is useful as a catalyst, absorbent and desiccant. In addition, a method of preparing the intermediate clear colloidal sol or gel consisting essentially of aluminum monohydrate is disclosed. This intermediate can be used to coat various substrates.

18 Claims, No Drawings

TRANSPARENT ACTIVATED NONPARTICULATE ALUMINA AND METHOD OF PREPARING SAME

CROSS REFERENCE TO RELATED APPLICATION

This is a divisional application of U.S. Ser. No. 281,434 filed Aug. 17, 1972, now abandoned which in turn is a continuation-in-part application of U.S. Ser. No. 234,303 filed Mar. 13, 1972, now abandoned.

BACKGROUND OF THE INVENTION

There are many known forms of alumina such as alpha, gamma, delta, eta, theta, kappa, and chi all of which are activated except alpha. Such activated aluminas are of commercial importance because of their high surface areas which make them especially useful as catalyst supports. However, these aluminas are usually in powder or particle form and must be dispersed in a liquid medium before they can be applied as a coating over other materials. Dispersing the active forms of alumina is not only difficult but in some cases impossible due to agglomeration of the particles.

Activated aluminas as set forth by Stumpf et al, Industrial and Engineering Chemistry, 42, 1398 (1950) can be prepared in various ways. One method disclosed in U.S. Pat. No. 3,019,080 involves the hydrolysis of aluminum alkoxides in the presence of aqueous ammonia to produce pure alumina of unspecified form.

Another method set forth in U.S. Pat. No. 3,038,784 comprises hydrolyzing an aluminum alcoholate in the presence of hydrogen peroxide at from 0° to 22°C. to form amorphous alumina. Gamma alumina is produced in U.S. Pat. No. 2,749,216 by hydrolyzing aluminum alkoxides at a temperature of 212° to 300°F. In U.S. Pat. No. 2,796,326 aluminum secondary butoxide is hydrolyzed with water at 32° to 70°F. to yield eta alumina. U.S. Pat. No. 3,357,791 discloses the hydrolysis of aluminum alkoxides in the presence of either acid or base to obtain colloidal particles of alpha alumina. All of these methods result in nontransparent, particulate forms of alumina as contrasted to the nonparticulate, transparent, porous form of the present invention.

More recently, Continental Oil Corporation, Ponca City, Oklahoma, developed a dispersed form of alumina marketed under the tradename of DISPAL. When this material is dispersed in an acidic medium, it has a milky appearance and can be dehydrated at about 500°C. to gamma alumina with a surface area of 320 square meters per gram. However, this dispersed product has a much larger particle or agglomerate size and cannot be converted by heat to the transparent, nonparticulate, porous alumina now claimed.

SUMMARY OF THE INVENTION

It has been discovered that a novel form of alumina with unique properties can be prepared by hydrolyzing aluminum alkoxides such as the methoxide, ethoxide, isopropoxide and secondary butoxide provided certain critical processing parameters are observed. These parameters include (1) at least 8 moles and preferably more than 20 moles of water per mole of aluminum alkoxide for hydrolysis (2) addition of about 0.03 to about 0.2 mole of a strong or moderately strong acid with an ionization constant of at least $1 \times 10^{-5}$ per mole of aluminum alkoxide (3) using acids of sufficient strength which do not complex with aluminum at low concentrations and which are added preferably after the aluminum alkoxide is hydrolyzed and (4) heat treating the resulting slurry above 80°C. for a period of time to obtain a clear, colloidal solution which can be applied over other materials to form a thin and continuous coating. If desired, the solution can be concentrated to form a gel which is then dried and pyrolyzed at about 500°C. to complete the conversion to alumina in a transparent, nonparticulate, porous form with a high surface area.

DETAILED DESCRIPTION OF THE INVENTION

In the first step of the process of this invention, one mole of an aluminum alkoxide (preferably aluminum isopropoxide or aluminum secondary butoxide) or combinations thereof is added to at least 8 moles and preferably from 70 to 200 moles of water at a temperature preferably from 60° to 80°C. The mixture is stirred for about 15 minutes or until the hydrolysis of the alkoxide is essentially complete.

If less than 8 moles of water per mole of alkoxide are used, the desired transparent, nonparticulate alumina is not produced. If 8 to 20 moles of water per mole of alkoxide are used, a clear gel rather than a solution results in which case the heat treatment must be carried out in a closed system. Below 12 moles of water, heat supplied by the exothermic reaction of hydrolysis may be sufficient to obviate the necessity of the subsequent heat treatment. If a water temperature of less than 60°C. is used for the hydrolysis, the aluminum monohydrate first formed is unstable and is converted to aluminum trihydrate within 20 hours or less. When this occurs, peptizing the slurry to a clear solution is very difficult if not impossible so that slurries prepared with cold water should be heated and peptized before such conversion takes place.

In the second step, an acid with an ionization constant of at least $1 \times 10^{-5}$ and having a noncomplexing anion with aluminum in low concentration such as nitric, hydrochloric, perchloric, formic, acetic or chloroacetic acids or combinations thereof is added. The acid concentration employed is within the range of about 0.03 to 0.2 mole per mole of alkoxide and preferably about 0.07 mole of acid per mole of alkoxide is added in the case of noncomplexing, strong acids. However, with acids of moderate strength such as acetic acid, it is possible to add as much as 0.250 mole of acid per mole of alkoxide. This acid should be introduced preferably after the hydrolysis of the alkoxide is substantially complete to avoid longer heat treatment and formation of non-colloidal particles which must be removed before peptization.

If desired, the acid can be introduced in the form of a water soluble salt such as zirconium nitrate, calcium nitrate, ammonium nitrate, aluminum chloride and the like which will hydrolyze to produce an acidic solution.

The third step of the present invention consists in heat treating the hydrolyzed aqueous slurry above 80°C. until a clear solution is formed. Below this temperature, peptization of the precipitate in the slurry is extremely slow and may require as much as 30 days whereas at about 95°C. peptization is complete in about several hours to several days depending upon the acid concentration. Stirring during the heat treatment will enhance the rate of peptization. Alternatively, the slurry can be heated above 100°C. in a pressurized container to enhance the rate of peptization. The colloidal solution is then evaporated to any desired concentration. About 25 gram equivalents of $Al_2O_3$ per 100 milliliters of solution can be obtained prior to gelling if the amount of acid employed is about 0.07 mole per mole of alkoxide. Variations from this acid concentration above or below cause a rapid increase in the gelling volume of the sol and therefore a sharp decrease in the concentration of equivalent alumina occurs.

If required, the fourth step involves the formation of the gel by either heating the clear, colloidal solution of step 3 above to evaporate the excess liquid or by adding an organic base such as urea and preferably an inorganic base such as ammonium hydroxide. Gels can also be formed using 8 to 20 moles of water per mole of alkoxide in the initial hydrolysis step without going through the solution stage. Since the gel has a low cohesion, it must be supported on a liquid or solid which has a low adhesion to the gel. The concentrated solutions can be gelled in dialysis bags by evaporation or by contacting the bags with liquid or gaseous ammonia. A preferred support is mercury which prevents cracking due to the shrinkage which occurs during drying. Once the gel has formed, it is dried at room temperature during which time considerable shrinkage occurs unless it is in the form of a thin coating on a rigid substrate. These gels can also be extruded to produce monolithic, activated alumina articles such as tubing for filtering and catalytic reactor applications. The strength of such articles is significantly increased if exposed to ammonia during the forming stage.

In the fifth step of the present process, the dried gel is pyrolyzed at a temperature of about 500° to 1,200°C. and preferably below 1,000°C. to remove water and residual carbon resulting in a weight loss of about 17 – 20%. The time of heating at temperatures above 900°C. must be limited to avoid alpha alumina formation and sintering. Most of the loss occurs at 375° - 475°C. and within this heating range extreme care must be taken to prevent fracture such as by heating at a rate of 2°C. per hour. At temperatures below about 500°C., the partially pyrolyzed product is mainly a mixture of aluminum monohydrate and alumina. The solid alumina which results is transparent, activated, nonparticulate, about 63% porous with an orderly domain of 50 to 100 angstroms and over 90% of the pores are within several angstroms of a radius which can be varied from 30 to about 150 angstroms by heat treatment without causing any broadening of the pore size distribution.

Finally, if desired, the alumina produced in the preceding step can be converted to alpha alumina nondestructively by heat treating at a temperature above 900°C. The conversion proceeds very slowly at 900°C. and is completed within a few minutes at 1,200°C.

PREFERRED EMBODIMENTS

The following examples more clearly set forth the metes and bounds of the critical parameters which must be employed in the now claimed process in order to obtain the unique alumina resulting from the practice of the present invention.

EXAMPLE 1

Deionized water (100 moles, 1800 ml.) was heated to 75°C. and one mole (204 grams) of aluminum isopropoxide was added. The mixture was stirred for 15 minutes and then 0.072 mole (2.4 grams) of hydrochloric acid was added. The resulting slurry was heated in an oven at 95°C. and after 24 hours a clear, colloidal solution of aluminum monohydrate formed. The term "aluminum monohydrate" as employed herein means an aluminum containing material which has a loss on ignition corresponding to about the monohydrate form of aluminum and also contains small amounts of organic material corresponding to a carbon content of about 2%. The same procedure was then used except that the hydrolysis was performed with water at room temperature (23°C.). After holding samples for various intervals up to 60 hours, each slurry was heated for 4 days at 95°C. Good peptization was obtained during the first 2½ hours but after that period of time, the aluminum monohydrate formed was substantially converted to aluminum trihydrate and could not be peptized. It was also found that the rate of conversion to the trihydrate could be retarded by adding an alcohol to the slurry. However, when water above 40°C. is used initially for the hydrolysis, no significant conversion to the trihydrate occurs.

EXAMPLE 2

One mole of aluminum isopropoxide was hydrolyzed with 100 moles of water at 75°C. and acidified with 0.072 mole of HCl. The resulting slurry was heated at 75°C. for 4 days but about half of the precipitate remained since the temperature was below 80°C. but readily peptized when heated at 95°C.

EXAMPLE 3

Aluminum isopropoxide (51 grams, 0.25 mole) was hydrolyze with 360 grams (20 moles) of water at 75°C. and 0.064 mole (1.7 grams) of hydrochloric acid per mole of alkoxide was added. The slurry was placed in a pressurized container and heated at 120°C. for 6 hours after which time a colloidal solution which appeared clear to the naked eye formed.

EXAMPLE 4

One mole of $Al(OC_3H_7)_3$ was hydrolyzed with 100 moles of water at 75°C. After 15 minutes of stirring, various amounts of HCl were added to aliquots thereof, then heat treated, gelled by evaporation and pyrolyzed above 500°C. with the following results.

| Moles of Acid Per Mole of Alkoxide | Condition of Slurry After Heating 4 days at 95°C. | Appearance of $Al_2O_3$ After Pyrolysis |
|---|---|---|
| 0.015 | Precipitate remains | — |
| 0.023 | Precipitate remains | — |
| 0.038 | Clear, no precipitate | Transparent & non-particulate |
| 0.046 | Clear, no precipitate | Transparent & non-particulate |
| 0.053 | Clear, no precipitate | Transparent & non-particulate |
| 0.069 | Clear, no precipitate | Transparent & non-particulate |
| 0.107 | Clear, no precipitate | Transparent & non-particulate |

| Moles of Acid Per Mole of Alkoxide | Condition of Slurry After Heating 4 days at 95°C. | Appearance of Al$_2$O$_3$ After Pyrolysis |
|---|---|---|
| 0.154 | Clear, no precipitate | Opaque & particulate |
| 0.207 | Clear, no precipitate | Opaque & particulate |
| 0.246 | Clear, no precipitate | Opaque & particulate |

This data shows that when the acid-alkoxide ratio is below about 0.03 mole of acid per mole of alkoxide, only part of the precipitate peptizes upon heating. Above 0.150 mole of acid per mole of alkoxide, the slurry becomes clear and free of precipitate when heat treated but the resulting alumina from these sols is opaque and particulate whereas within the critical range of about 0.03 to 0.2 mole of acid per mole of alkoxide, not only all the precipitate peptized but also when pyrolyzed the resulting alumina is always transparent, nonparticulate and porous.

EXAMPLE 5

One mole (246 grams) of aluminum secondary butoxide was hydrolyzed with 200 moles of water at 75°C. and aliquots thereof treated with various amounts of HCl, heat treated, gelled by evaporation and pyrolyzed at 600°C. as shown in the table below.

| Moles HCl Per Mole of Alkoxide | Condition of Slurry After Heating 4 days at 95°C. | Appearance of Al$_2$O$_3$ After Pyrolysis |
|---|---|---|
| 0.014 | Precipitate remains | — |
| 0.022 | Precipitate remains | — |
| 0.037 | Clear, no precipitate | Transparent, non-particulate |
| 0.044 | Clear, no precipitate | Transparent, non-particulate |
| 0.052 | Clear, no precipitate | Transparent, non-particulate |
| 0.066 | Clear, no precipitate | Transparent, non-particulate |
| 0.104 | Clear, no precipitate | Transparent, non-particulate |
| 0.149 | Clear, no precipitate | Transparent, non-particulate |
| 0.202 | Clear, no precipitate | Opaque, particulate |
| 0.238 | Clear, no precipitate | Opaque, particulate |

As with the aluminum isopropoxide of the preceding example, only a small amount of the precipitate peptized upon heating when less than about 0.03 mole of HCl per mole of butoxide was employed. Within the critical limits of about 0.03 to 0.2 mole of acid per mole of butoxide, a clear colloidal solution foms when heat treated which when gelled and heated above 500°C. produces the desired transparent, nonparticulate alumina which is 63% porous and thermally stable up to about 1,200°C. When the upper limit of acid is exceeded, a clear solution results but after heat treating, gelling and pyrolyzing, alumina formed is opaque and particulate.

EXAMPLE 6

One mole of aluminum secondary butoxide was hydrolyzed with 100 moles of water at 75°C. and 17 grams (.04 mole) zirconium nitrate pentahydrate were added. After a 3-day heat treatment at 95°C. a clear sol resulted. This and similar examples show that the necessary acidity can be produced by the addition of a water soluble salt or other acid producing compounds such as aldehydes which when heated form acids.

EXAMPLE 7

One mole of aluminum secondary butoxide was hydrolyzed with 25 moles of water at 75°C. After mixing for 15 minutes, 0.20 mole of acetic acid having an ionization constant of $1.7 \times 10^{-5}$ was added. The resulting slurry was heated 7 days at 95°C. and the colloidal solution obtained which was clear to the unaided eye was gelled with NH$_4$OH and pyrolyzed at 600°C. to form a transparent, nonparticulate, porous alumina.

If desired, other selected acids may be used for acidification. In general, the acids must meet two requirements (1) the anion of the acid must be non-complexing with aluminum within the critical acid range employed and (2) the acid must be sufficiently strong to produce the necessary charge effect at these concentrations. Such acids include nitric, perchloric, formic, monochloroacetic, dichloroacetic and trichloroacetic or combinations thereof. To determine if an acid will complex with aluminum, it is simply added to the alkoxide after hydrolysis above 40°C. and then peptized above 80°C. and if a clear colloidal solution of aluminum monohydrate forms, then no complexing occurred. Similar results are obtained when other aluminum alkoxides or combinations thereof are hydrolyzed, acidified and peptized such as the methoxide, ethoxide, pentoxide, hexoxide, heptoxide and octoxide and isomers thereof but aluminum isopropoxide and aluminum secondary butoxide are preferred.

Once the alkoxide, water and acid have been combined and peptized and a clear, colloidal sol prepared, a gel can be formed by either evaporation of the excess liquid such as by boiling or alternatively, by adding an organic base like urea or an inorganic base such as NH$_4$OH. Since the gel generally shrinks to about one-third to one-half its original size, a greased container should be used to minimize friction. When a thin film of the colloidal solution is applied on a rigid material, the gel formed will retain the dimensions of the substrate without cracking. After the gel is formed, it is dried at about 20°–35°C. until it attains its final size. The dried gel is ultimately pyrolyzed at temperatures above 500°C. by slowly heating at a uniform rate of about 2°C. per hour to prevent cracking of the porous, transparent, activated, solid alumina which results. If a partially pyrolyzed product is desired, the maximum temperature is limited to below 500°C.

EXAMPLE 8

One mole of aluminum isopropoxide was hydrolyzed with 100 moles of water at 75°C., treated with various amounts of hydrochloric acid, heated at 95°C. for 4 days to obtain a colloida sol clear to the naked eye, then gelled by evaporation and pyrolyz at 500°C. The results are shown in the table below wherein $m^2/g$ is square meters per gram and ml/g is milliliters per gram. The surface area, pore volume and pore radius were determined by the B-E-T (Brunauer, Emmett and Teller) method which makes use of gas adsorption and desorption measurements.

| Moles Acid Per Mole Alkoxide | % Equivalent of $Al_2O_3$ at Gel Point | Appearance of $Al_2O_3$ After Pyrolysis | Surface Area in $m^2/g$ | Pore Volume in ml/g |
|---|---|---|---|---|
| 0.038 | 15 | Transparent, non-particulate | 230 | 0.420 |
| 0.053 | 17 | Transparent, non-particulate | 228 | 0.431 |
| 0.070 | 25 | Transparent, non-particulate | 232 | 0.451 |
| 0.107 | 11 | Tendency to crack | 210 | 0.393 |
| 0.246 | 2.5 | Opaque, particulate | 154 | 0.186 |

This example shows that beyond the upper limit of 0.150 mole of acid per mole of alkoxide, the equivalent alumina concentration at the gelling point of the sol greatly diminishes, the $Al_2O_3$ after pyrolysis becomes opaque and both the surface area and pore volume are drastically reduced. However, about 0.07 mole of acid per mole of alkoxide results in optimum porosity, strength, surface area and transparency of the resultant alumina.

EXAMPLE 9

A gel prepared under the optimum conditions described in Example 8 was heat treated for 24 hours at various temperatures to determine the effect on surface area, pore radius and pore volume of the resulting alumina. The data are shown in the following table.

| Heat Treatment Temp. °C. | Pore Radius With most Vol. in Angstroms | Pore Volume in ml/g | Surface Area in $m^2/g$ |
|---|---|---|---|
| 200 | 36 | 0.367 | 251 |
| 300 | 39 | 0.363 | 249 |
| 400 | 50 | 0.457 | 248 |
| 500 | 53 | 0.477 | 197 |
| 900 | 94 | 0.437 | 115 |
| 1000 | 114 | 0.353 | 80 |

It is apparent from this data that pore size can be increased by a heat treatment. The surface area decreases as the temperature increases but at any selected temperature below 900°C., the surface area becomes stable after 24 hours. In contrast, the pore volume increases up to 500°C. and then remains constant up to 900°C. At temperatures at 500°C. and above, no further weight loss occurs which indicates the conversion to alumina is essentially complete.

EXAMPLE 10

A colloidal sol prepared as described in Example 1 was gelled by the addition of ammonium hydroxide. After drying at room temperature, the gel was heated to 200°C. and then machined by drilling several holes and channels in the material. The drilled article was thereafter pyrolyzed at 600°C. to obtain a solid, transparent alumina which was 63% porous. Upon heating to 1,200°C., a porcelain-like, pure alpha alumina was formed with about 18% shrinkage but no cracks since surface nucleation and crystallization occur simultaneously during the heat treatment. It was found that the tendency to crack during machining is diminished when the heat treatment does not exceed 400°C. Alternatively, the entire article can be impregnated with a liquid such as benzyl alcohol during the machining process to prevent cracking.

EXAMPLE 11

A mixture of 100 moles (1800 ml.) of water and 0.150 mole (5.4 grams) of HCl was heated to 75°C. and one mole (204 grams) of aluminum isopropoxide was added with stirring. The slurry which formed was heated at 95°C. in an oven but was still somewhat cloudy after 48 hours as contrasted to a similar slurry prepared in Example 1 which formed a clear solution after 24 hours at 95°C. but wherein the acid was added after the hydrolysis of the alkoxide.

EXAMPLE 12

One mole of aluminum isopropoxide was hydrolyzed with 12 moles of water containing 0.1 mole of acetic acid at 25°C. The resulting mixture was placed in a closed container and heated in an oven at 120°C. for 12 hours. The clear gel which formed was extruded into tubes one millimeter in diameter. The tubes were dried and fired at 500°C. to form monolithic, activated alumina.

EXAMPLE 13

Aluminum methoxide (78 grams) was added in portions to 1 liter of boiling water with stirring in 10 minutes. Concentrated nitric acid (4.1 grams) was then added and the mixture gently boiled to remove the methanol formed. After one hour, the mixture was refluxed for 3 hours to complete the sol formation which was found to have the same properties as the sols prepared from other aluminum alkoxides used in the preceding examples.

Although high surface area aluminas are well known for their use as catalysts, adsorbents and desiccants, some potential applications of these materials are limited by the fact that they cannot be coated over other materials as continuous films and produced as nonparticulate, monolithic articles. These desirable properties are characteristic of the transparent alumina of this invention whose X-ray diffraction pattern shows broad peaks at 1.40, 1.96 and 2.40 angstroms similar to delta alumina except for the peak intensity ratios. The index of refraction for the new transparent alumina is 1.62 – 1.67 compared to 1.76 for alpha alumina. The claimed alumina is stable in HCl, $H_2SO_4$, $HNO_3$ and water but not in HF or $NH_4OH$. It has a porosity of about 63%, a surface area of 80 to 250 square meters per gram controlled by heat treatment, reasonably good optical transmission and is stable up to about 1,000° to 1,200°C. at which temperature it transforms to alpha alumina nondestructively. The thermal coefficient of expansion is about $60 \times 10^{-7}$ per degree centigrade.

As previously stated, the intermediate clear colloidal sol containing essentially aluminum monohydrate can be used to coat various porous and nonporous substrates such as glass, glass ceramic or porous ceramic to produce after pyrolysis a surface area which is extremely active and is capable of absorbing obnoxious gases from the atmosphere. The essentially transparent nonparticulate, porous product obtained by incomplete pyrolysis at 100° – 500°C. also has a high surface area and is useful as an adsorbent and dessicant. The transparent, solid, porous alumina prepared from the clear sol by gelling and pyrolyzing above 500° C. is useful as a catalyst in chemical reactions.

The type of aluminum alkoxide contemplated for use in the present invention can be represented by the formula $Al(OR)_3$ wherein R is a straight or branched alkyl group containing from one to 24 carbon atoms, although alkyl groups of from two to eight carbon atoms are preferred.

What is claimed is:

1. A method for preparing a transparent, monolithic, nonparticulate, porous product consisting essentially of alumina with a total porosity of at least 50% which comprises the steps of:
   a. providing an acid peptized, clear colloidal solution by hydrolyzing an aluminum alkoxide of the formula $Al(OR)_3$, wherein R is an alkyl of 1–24 carbon atoms, with water, wherein the mole ratio of water to said alkoxide is at least 8:1 and wherein said acid peptization is effected with about 0.03 to about 0.250 moles of acid per mole of said alkoxide, said acid having an ionization constant of at least $1 \times 10^{-5}$ and having a noncomplexing anion with aluminum,
   b. gelling said clear solution, and
   c. drying said gel and pyrolyzing same by heating at a rate sufficiently slow to preclude cracking at a temperature in excess of about 500°C. and for a time insufficient to form alpha $Al_2O_3$ but sufficient to form said transparent, monolithic, porous, nonparticulate $Al_2O_3$ product.

2. A method as in claim 1 in which the colloidal solution is gelled by evaporation of the excess liquid.

3. A method as in claim 1 in which the dried gel is pyrolyzed at about 500° to 600°C.

4. A method as in claim 1 which includes the additional step of nondestructively converting the transparent, nonparticulate alumina to alpha alumina by further heating above about 900°C.

5. The method of claim 1 wherein the moles of said acid per mole of alkoxide is about .03 to about .15 and wherein the mole ratio of water to said alkoxide is about 70:1 to about 200:1.

6. The method of claim 5 wherein said acid is HCl.

7. The method as in claim 5 in which about .07 moles of acid per mole of alkoxide are employed.

8. The method of claim 1 wherein step (a) comprises combining said alkoxide and water at a temperature of about 40 to about 80°C., adding said acid thereto, and then heating at a temperature of about 80°C. to about 160°C.

9. The method as in claim 8 wherein said heating temperature is about 80°C. to about 95°C. and said heating is done for a period of from 2 to 4 days.

10. The method as in claim 8 in which from 70 to about 200 moles of water per mole of alkoxide are combined at a temperature from 60° to 80°C.

11. The method of claim 1 in which the alkoxide is a member of the group consisting of the methoxide, ethoxide, propoxide, and butoxide of aluminum and isomers thereof.

12. The method as in claim 1 in which the alkoxide is aluminum isopropoxide.

13. The method as in claim 1 in which the alkoxide is aluminum secondary butoxide.

14. A method as in claim 1 in which the equivalent acidity is produced by adding a water soluble acidic salt having a noncomplexing anion with aluminum.

15. A method as defined in claim 1 in which the colloidal solution is gelled by adding a base thereto.

16. A method as in claim 14 in which the base is $NH_4OH$.

17. The method of claim 1 wherein the amount of said acid is between about .03 to about .150.

18. A method for preparing a transparent, monolithic, nonparticulate, porous product consisting essentially of $Al_2O_3$ which comprises the steps of:
   a. providing a gel of the hydrolysis product obtained by hydrolyzing an aluminum alkoxide of the formula $Al(OR)_3$, wherein R is an alkyl of 1–24 carbon atoms, with water and an acid wherein the mole ratio of water to said alkoxide is in the range of 8:1 to 20:1 and wherein said acid is employed in an amount of about .03 to about .250 moles of acid per mole of said alkoxide, said acid having an ionization constant of at least $1 \times 10^{-5}$ and having a noncomplexing anion with aluminum,
   b. drying said gel, and
   c. pyrolyzing said gel by heating at a rate sufficiently slow to preclude cracking at a temperature in excess of about 500°C. so as to form said transparent, monolithic, porous, nonparticulate $Al_2O_3$ product, said heating being insufficient to form alpha alumina.

* * * * *